May 27, 1941.　　　　G. T. KINNEY　　　2,243,380
WHEEL CONSTRUCTION
Filed June 23, 1939　　　2 Sheets-Sheet 2

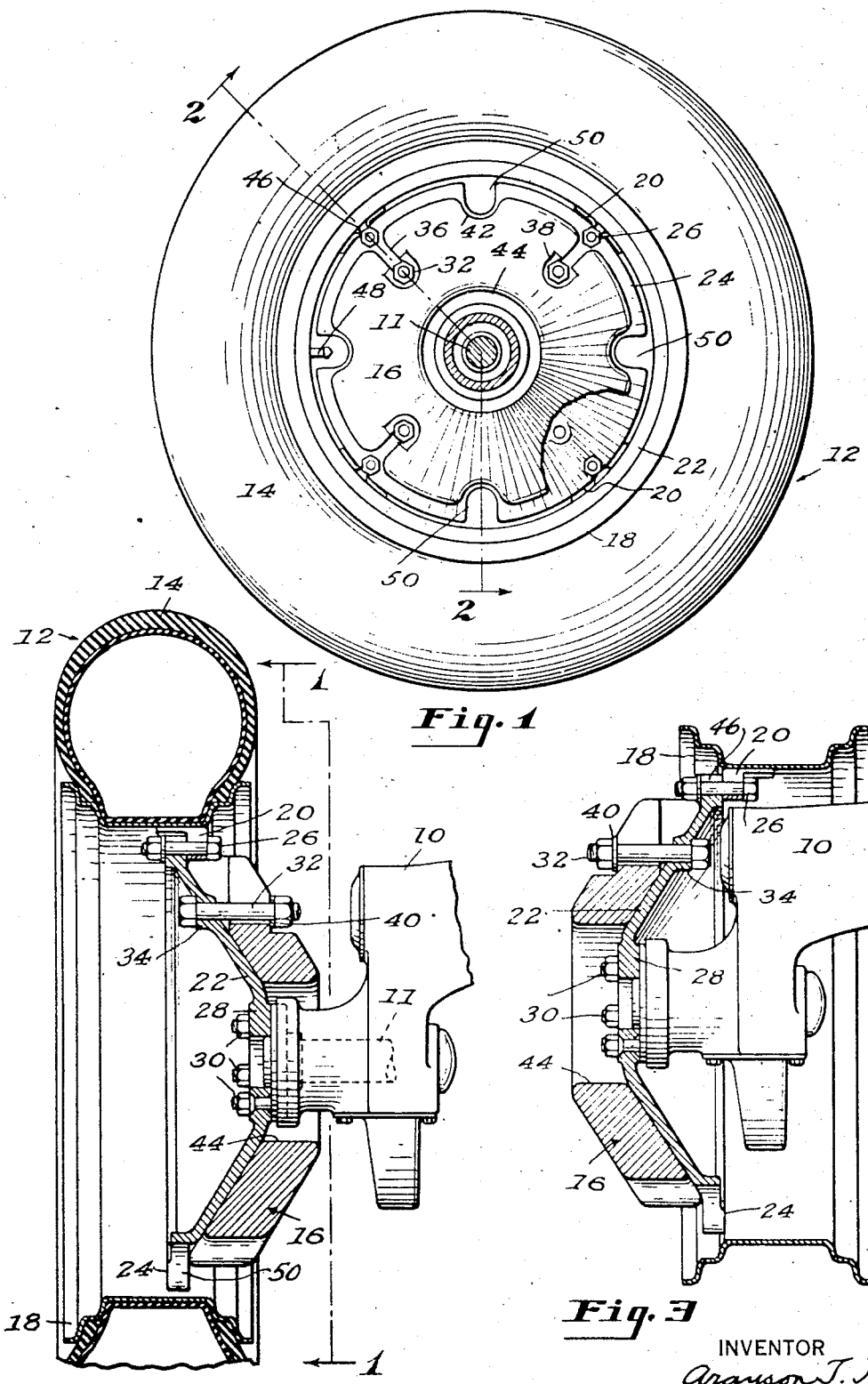

INVENTOR
Grayson T. Kinney
BY George Douglas Jones
ATTORNEY

Patented May 27, 1941

2,243,380

UNITED STATES PATENT OFFICE 2,243,380

WHEEL CONSTRUCTION

Grayson T. Kinney, Cleveland, Ohio, assignor to The Cleveland Tractor Company, Cleveland, Ohio Application June 23, 1939, Serial No. 280,862

4 Claims. (Cl. 301—41)

This invention relates to wheel constructions for vehicles and has particular application to tractor wheels which are provided with pneumatic tires and detachable weights for varying their traction.

It will be appreciated that tractors suitable for general use are relatively small and light in order that they may be useful for a wide variety of purposes. When such tractors are provided with means for giving their driving wheel adequate traction, they are capable of a much greater tractive effort. For example, under suitable conditions, two ploughs may be pulled instead of one. Hitherto, it has been the practice to vary the traction by adding weights of one form or another to the driving wheels.

One of the purposes of this invention is to provide means associated with a wheel for supporting a removable traction weight on a conical or inclined surface so that no shearing action will be exerted by the weight on its attaching and supporting bolts.

Another principal purpose of this invention is to provide a wheel construction in which a rim and a wheel disc are so constructed and arranged that they will permit variations in the tread of a tractor, and thus adapt it to many different kinds of agricultural operations.

An ancillary object is to provide a novel wheel construction such that the rim and tire may be removed without disturbing the detachable traction weight.

In general, this invention comprises a wheel construction which includes a pneumatic tire, a rim, a dished and demountable wheel disc, and a detachable traction weight which has a surface in complemental engagement with the wheel disc. Additional advantages of such construction will appear as the details are described in the following parts of the specification.

Further novel features of improvement contributing to ease of manufacture and use will be perceived and understood from reading the following detailed description of a preferred and illustrative embodiment of the invention in connection with the accompanying drawings, in which Fig. 1 is a side elevation of a wheel and tire assembly as seen from the inner side thereof or in the direction of line 1—1 of Fig. 2;

Fig. 2 is a partial longitudinal section taken upon the line 2—2 of Fig. 1;

Fig. 3 is a longitudinal section similar to that of Fig. 2, except that it shows a contemplated rearrangement of the wheel parts and an axle, and omits the pneumatic tire;

Figure 8:
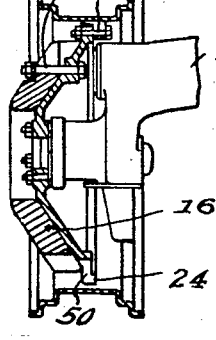

Fig. 8 in a view similar to Fig. 2 illustrates a further rearrangement of the wheel parts for varying the vehicle tread.

In Figs. 2 and 3 of the drawings 10 indicates an offset axle housing carrying a driving axle 11 for rotating a wheel 12. The wheel 12 comprises a conventional pneumatic tire 14, a wheel weight 16 of cast iron, or other suitable material such as concrete, and a flanged metallic wheel rim 18 for retaining the tire 14. A circumferentially spaced series of radial lugs or loop members 20 project inwardly of the rim 18 and are arranged to lie in a plane which is adjacent one edge of said rim. It is to be understood that the lugs 20 may be integrally secured to the rim 18 in a suitable manner, such as welding, and that they provide abutments against which a metal wheel disc 22 of frusto-conical or dished shape may be secured. From Figs. 2, 3, and 5 it will be perceived that the disc 22 is open at both ends and has a perforated outer flange 24 through which may be passed bolts 26 for joining the disc to the lugs 20 of wheel rim 18.

The axle 11 which has been referred to previously may be detachably connected to the center portion of wheel disc 22 by means such as the bolts or studs 30. Those experienced in this art will realize that the metal wheel disc 22 will be preferably cast, although it may be formed in other well known ways.

An intermediate series of circumferentially spaced bolts 32 pass through perforated bosses 34 of disc 22 and extend through correspondingly spaced radial slots 36 of the wheel or traction weight 16, so as to detachably and rigidly secure the latter to the wheel assembly 12. With the slots 36, it is relatively simple to retain the weight 16 loosely on one or two of the four bolts 32 while it is being mounted.

Figure 6:
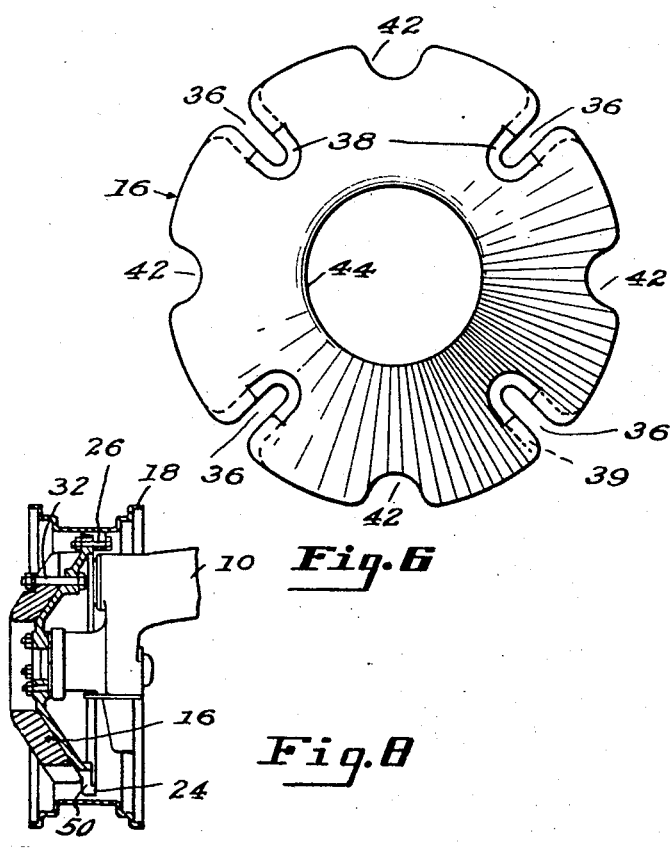
Fig. 6 is a side elevation of the traction weight.
Figure 7:
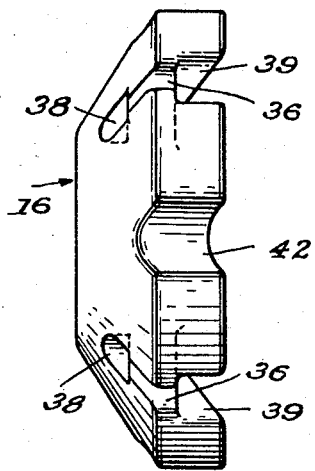
Fig. 7 is an edge or end elevation of the weight shown in Fig. 6.

In Figs. 6 and 7 the weight 16 is shown to be of generally frusto-conical shape and to be provided with flat recessed seats 38 at the bottom of slots 36. The seats 38 are disposed to provide a surface which is parallel to that of the wheel disc bosses 34 upon which the bolts 32 bear. Grooved troughs 39 on the underside of weight 16 and slots 36 provide clearance for the wheel disc bosses 34 and permit the assembly of the weight and outer side of disc 22 in complemental engagement. The nut ends of bolts 32 may be provided with suitable washers 40 which engage the recessed seats 38 of slots 36.

Intermediate the slots 36 of weight member 16 are a series of notched portions 42 which permit the weight readily to clear the lugs 20. The outside diameter of the weight member 16 and that defined by the circumferentially spaced lugs 20 are approximately the same in the illustrated embodiment of the invention. Note is taken also of the circular opening 44 in the center of weight 16 and of the manner in which this portion of the weight surrounds the concentric portions of the housing 10 and axle 11.

Figure 4:
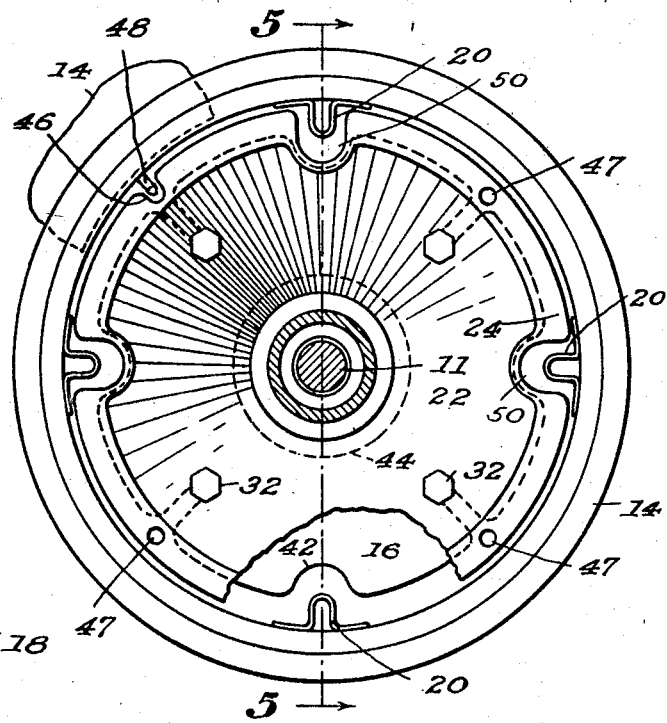
Fig. 4 is a side elevation of a wheel and tire assembly as viewed from the inner side and with certain of the parts shown fragmentarily.

It is to be observed further that the wheel disc 22 is provided at one point with a circumferential notch 46 instead of an aperture 47, which in assembling clears the valve stem 48 of tire 14, as seen in Fig. 4.

The foregoing description of the details of this invention makes it clear that the parts constituting the wheel construction can be assembled in numerous ways which will provide substantial variations in the tread of the tractor or other vehicle without the addition or removal of extension members. For example, the arrangement of Fig. 2 will be used when a tread of maximum width is desired. It will be necessary in this instance to assemble the hollow weight 16 on the wheel disc 22 before the latter is secured to the axle 11. However, in the arrangements of Figs. 3 and 5, and any other in which the end of the axle 11 is located within the limits of the wheel disc 22, the weight 16 may be attached or removed without disturbing the other parts of the wheel and axle assembly.

Figure 5:
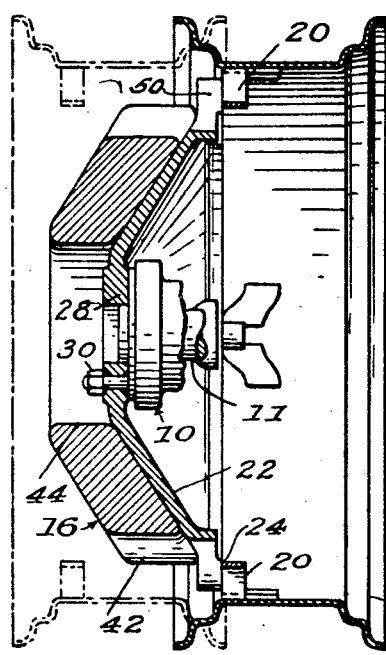
Fig. 5 is a longitudinal section upon the line 5—5 of Fig. 4 and includes an additional rim in dotted lines for the purpose of illustrating the manner of assembling.

Reference is now made to Figs. 4 and 5 for a further explanation of an important feature of this invention. With the wheel disc 22 and rim 18 in the relative positions of Fig. 4, it is possible to slide said rim past or over the disc 22 by reason of a circumferentially spaced series of notches 50 which provide adequate clearance for the rim lugs 20. The notch portions 42 of weight member 16 are in alignment with the notches 50 when the weight is in place. In Fig. 5, the rim 18 has been shifted laterally from the dotted line position to the one shown in solid lines which corresponds to Fig. 4. In this latter position it will be possible to rotate the rim and bring its lugs 20 into alignment with the corresponding apertures 47 in the outer flange 24 of the wheel disc 22.

The arrangement of tire rim and wheel disc, illustrated in Fig. 8, is an advantageous one for the reason that the disc 22 and weight 16, when the latter is used, lie almost wholly within the tire and rim.

A comparison of Figs. 2, 3, 5 and 8 will suggest three substantial and symmetrical variations of tread width which this invention affords. Moreover, obvious combinations of these arrangements can be made to produce six additional and non-symmetrical treads.

Attention is now called particularly to the manner in which the weight 16 is carried on the wheel disc 22, as best illustrated in Figs. 2 and 3. The complemental relationship or in face-to-face engagement of the outer face of disc 22 and the inner face of the weight 16 cause the latter to be supported in a large measure on the disc instead of hanging, as has been customary, from a set of bolts and exerting objectionable shearing forces on said bolts. An inspection of these figures will show that the bolts 32 are in tension and not subject to shear.

Although there is herein shown and described only one form of wheel construction embodying this invention, it is to be understood that various changes and modifications may be made herein without departing from the spirit of said invention and the spirit and scope of the appended claims.

Having thus described my invention, what I claim as new and desire to secure by Letters Patent of the United States is:

1. A traction wheel which includes a dished wheel disc, a weight member having a surface complemental to the convex face of the disc and in continuous engagement therewith, and means extending through the weight member at spaced points for detachably connecting the weight member to the disc.

2. A traction wheel which includes a dished wheel disc; a weight disc having a surface complemental to the outer face of the disc and in face-to-face engagement therewith, said weight disc being provided with circumferentially spaced radial slots; and bolts passing through the slots of the disc in position for detachably connecting the weight member to the disc.

3. A unitary wheel weight having the shape of a frusto-conical disc with a central opening, a plurality of circumferentially spaced slots extending inwardly from its outer edge for receiving attaching bolts or the like, said slots each having a flat recessed seat at its bottom on the outer side of the weight and said slots each opening into a parallel trough of greater width than the slot on the under side of said weight, and edge notches intermediate the slots for clearing the lugs of a rim.

4. A traction wheel which includes a frusto-conical wheel disc, a weight member having a frusto-conical surface complemental to the convex face of the disc and in face-to-face engagement therewith, and means for detachably connecting the weight member rigidly to the disc.

GRAYSON T. KINNEY.